US010063653B2

(12) United States Patent
Balakrishnan et al.

(10) Patent No.: US 10,063,653 B2
(45) Date of Patent: Aug. 28, 2018

(54) DISTRIBUTED SERVER ARCHITECTURE FOR SUPPORTING A PREDICTIVE CONTENT PRE-FETCHING SERVICE FOR MOBILE DEVICE USERS

(71) Applicant: Akamai Technologies, Inc., Cambridge, MA (US)

(72) Inventors: Prasandh Balakrishnan, Brookline, MA (US); James V. Luciani, Acton, MA (US); Ravi S. Aysola, Acton, MA (US); Richard G. D'Addio, Amesbury, MA (US); Lawrence Gensch, Salem, NH (US); Ittehad Shaikh, Grafton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 273 days.

(21) Appl. No.: 14/584,820

(22) Filed: Dec. 29, 2014

(65) Prior Publication Data

US 2016/0191664 A1    Jun. 30, 2016

(51) Int. Cl.
*H04L 29/08* (2006.01)
*H04L 12/24* (2006.01)

(52) U.S. Cl.
CPC ........ *H04L 67/306* (2013.01); *H04L 41/5096* (2013.01); *H04L 67/1097* (2013.01);
(Continued)

(58) Field of Classification Search
CPC ..... H04L 67/327; H04L 67/306; H04L 67/10; H04L 67/26
(Continued)

(56) References Cited

U.S. PATENT DOCUMENTS 6,108,703 A     8/2000 Leighton et al.
6,256,746 B1 *  7/2001 Cheng ................... G06F 1/24
                                                713/600
(Continued)

FOREIGN PATENT DOCUMENTS

EP     1398715 A2    3/2004
EP     2330793 A1    6/2011
(Continued)

OTHER PUBLICATIONS

PCT/US15/67779, PCT International Search Report and Written Opinion dated May 2, 2016, 12 pages.
(Continued)

*Primary Examiner* — Ninos Donabed
(74) *Attorney, Agent, or Firm* — David H. Judson

(57) ABSTRACT

A content delivery network (CDN) is enhanced to enable mobile network operators (MNOs) to provide their mobile device users with a content prediction and pre-fetching service. Preferably, the CDN enables the service by providing infrastructure support comprising a client application, and a distributed predictive pre-fetching function. The client application executes in the user's mobile device and enables the device user to subscribe to content (e.g., video) from different websites, and to input viewing preferences for such content (e.g.: "Sports: MLB: Boston Red Sox"). This user subscription and preference information is sent to the predictive pre-fetching support function that is preferably implemented within or across CDN server clusters. A preferred implementation uses a centralized back-end infrastructure, together with front-end servers positioned in association with the edge server regions located nearby the mobile core network. The predictive pre-fetch service operates on the user's behalf in accordance with the user preference information.

18 Claims, 5 Drawing Sheets

(52) U.S. Cl.
CPC .......... *H04L 67/26* (2013.01); *H04L 67/2842* (2013.01); *H04L 67/2847* (2013.01); *H04L 67/2852* (2013.01); *H04L 67/2857* (2013.01); *H04L 67/2895* (2013.01); *H04L 41/0893* (2013.01); *H04L 67/02* (2013.01); *H04L 69/329* (2013.01)

(58) Field of Classification Search
USPC ........................................................ 709/203
See application file for complete search history.

(56) References Cited

U.S. PATENT DOCUMENTS

| | | | |
|---|---|---|---|
| 6,850,252 B1* | 2/2005 | Hoffberg | G06K 9/00369 |
| | | | 348/E7.061 |
| 7,099,934 B1* | 8/2006 | Ewing | G06F 1/26 |
| | | | 307/11 |
| 7,111,057 B1 | 9/2006 | Sherman et al. | |
| 7,240,100 B1 | 7/2007 | Wein et al. | |
| 7,376,716 B2 | 5/2008 | Dilley et al. | |
| 7,472,178 B2 | 12/2008 | Lisiecki et al. | |
| 7,904,505 B2 | 3/2011 | Rakers et al. | |
| 8,194,438 B2 | 6/2012 | Ahn et al. | |
| 8,356,074 B1* | 1/2013 | Ehrlich | H04L 67/322 |
| | | | 709/203 |
| 8,463,333 B2* | 6/2013 | Stuivenwold | G06F 1/3203 |
| | | | 370/310.2 |
| 8,477,837 B2 | 7/2013 | Yagasaki et al. | |
| 8,644,211 B2* | 2/2014 | Jacobson | H04L 12/10 |
| | | | 370/318 |
| 8,996,900 B2* | 3/2015 | Vetteth | G06F 15/16 |
| | | | 713/323 |
| 2004/0199665 A1 | 10/2004 | Omar et al. | |
| 2006/0160622 A1 | 7/2006 | Lee et al. | |
| 2007/0053513 A1* | 3/2007 | Hoffberg | G06K 9/00369 |
| | | | 380/201 |
| 2009/0254971 A1* | 10/2009 | Herz | G06Q 10/10 |
| | | | 726/1 |
| 2009/0316682 A1* | 12/2009 | Twitchell, Jr. | H04L 63/12 |
| | | | 370/351 |
| 2010/0161756 A1 | 6/2010 | Lewis et al. | |
| 2010/0250341 A1 | 9/2010 | Hauser et al. | |
| 2011/0029641 A1* | 2/2011 | Fainberg | G06F 17/30902 |
| | | | 709/219 |
| 2011/0035553 A1 | 2/2011 | Shepstone et al. | |
| 2011/0040718 A1 | 2/2011 | Tendjoukian et al. | |
| 2011/0047287 A1 | 2/2011 | Harrang et al. | |
| 2011/0320607 A1 | 12/2011 | Harrang et al. | |
| 2012/0042004 A1 | 2/2012 | Shenfield et al. | |
| 2012/0078727 A1* | 3/2012 | Lee | G06Q 30/02 |
| | | | 705/14.66 |
| 2012/0084151 A1* | 4/2012 | Kozak | G06Q 30/02 |
| | | | 705/14.58 |
| 2012/0084349 A1* | 4/2012 | Lee | G06Q 30/02 |
| | | | 709/203 |
| 2012/0158862 A1* | 6/2012 | Mosko | H04L 65/1069 |
| | | | 709/206 |
| 2012/0244863 A1 | 12/2012 | Kinomoto et al. | |
| 2013/0054729 A1 | 2/2013 | Jaiswal et al. | |
| 2013/0091215 A1 | 4/2013 | Funk et al. | |
| 2013/0097664 A1* | 4/2013 | Herz | G06Q 10/10 |
| | | | 726/1 |
| 2013/0117349 A1 | 5/2013 | Burnette et al. | |
| 2013/0124679 A1 | 5/2013 | Harrang et al. | |
| 2014/0059156 A1 | 2/2014 | Freeman et al. | |
| 2014/0108671 A1 | 4/2014 | Watson et al. | |
| 2014/0201126 A1* | 7/2014 | Zadeh | G06K 9/627 |
| | | | 706/52 |
| 2014/0295893 A1 | 10/2014 | Herlein et al. | |
| 2015/0039601 A1* | 2/2015 | Harrang | G06F 17/30867 |
| | | | 707/727 |
| 2015/0256646 A1* | 9/2015 | Hofmann | H04L 67/1095 |
| | | | 709/219 |
| 2015/0350245 A1* | 12/2015 | Twitchell, Jr. | H04L 63/04 |
| | | | 726/3 |
| 2016/0191651 A1* | 6/2016 | Balakrishnan | H04L 67/2847 |
| | | | 709/219 |

FOREIGN PATENT DOCUMENTS

| | | |
|---|---|---|
| WO | WO2008134880 A1 | 11/2008 |
| WO | WO2011054912 A1 | 5/2011 |

OTHER PUBLICATIONS

PCT/US2015/067793 European Search Report and Written Opinion dated May 2, 2016, 12 pages.
Extended European Search Report, European Patent Application 15876132.0, dated Jul. 12, 2018.
Extended European Search Report, European Patent Application 15876128.8, dated Jul. 12, 2018.

* cited by examiner

DISTRIBUTED SERVER ARCHITECTURE FOR SUPPORTING A PREDICTIVE CONTENT PRE-FETCHING SERVICE FOR MOBILE DEVICE USERS

BACKGROUND

Technical Field

This application relates generally to overlay networking and, in particular, to techniques to accelerate delivery of content (e.g., video) to end users on mobile networks.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Overlay networks platforms such as CDNs provide content acceleration to end user devices that access the public Internet via end user access networks, such as Internet service providers. Mobile device users, however, do not connect to the Internet directly; rather, these devices typically access Internet content via their cellular networks, or via a WiFi network. CDN servers, however, typically are not deployed within the cellular network. Thus, today the CDN edge server closest to the mobile network operator IP gateway (e.g., GGSN (3G-UMTS)/PDSN-HA (3G-CDMA) or PGW (LTE)) is used to accelerate content into the cellular network. As a consequence, typically the experience of viewing certain types of overlay network-delivered content on end user mobile devices is not very satisfactory. In particular, presently mobile device users download content interactively. The CDN delivers what the user requests. Users experience considerable latency when viewing large size content, such as video. The requests often happen during "peak traffic" hours when there is network congestion leading to packet drops and retransmission. This leads to inefficient use of network resources, slow or incomplete loading of content, and low quality of experience. Methods like adaptive bit rate streaming compensate for network congestion by downloading lower quality (low bit-rate) video and hence lower the Quality of Experience (QoE) even further.

It is also known in the prior art to provide solutions that enable end user mobile devices to retrieve content during off-peak periods for later viewing. While such techniques provide advantages, they have not been adapted to content delivery networks.

BRIEF SUMMARY

An overlay network, such as a content delivery network (CDN), is enhanced to enable mobile network operators (MNOs) to provide their mobile device users with a content prediction and pre-fetching service. Preferably, the CDN enables the service by providing infrastructure support comprising a client application, and a distributed predictive pre-fetching function. The client application executes in the user's mobile device and enables the device user to subscribe to content (e.g., video, music, other multi-media, and the like) from different websites, and to input viewing preferences for such content (e.g.: "Sports: MLB: Boston Red Sox"). This user subscription and preference information is sent to the predictive pre-fetching support function that is preferably implemented within or across CDN server clusters. A preferred implementation uses a centralized back-end infrastructure, together with front-end servers positioned in association with the edge server regions located nearby the mobile core network. The predictive pre-fetch service operates on the user's behalf in accordance with the user subscription and preference information. In particular, the back-end of the predictive pre-fetch service periodically detects new content available on the websites the CDN serves, determines (e.g., based on a prediction function) the subset that is of interest to the mobile device user, and creates a download manifest of such content. The download manifest preferably comprises meta-information about the content of interest to the user. The manifest is provided to a front-end server to which the end user's client application is or has been connected. The front-end server then notifies the client application to retrieve the download manifest to the end user mobile device, and then to pull down the content specified therein. The mobile device application downloads and caches the content(s) specified in the manifest, preferably in a background manner. Later, the mobile device user can then view the content through the client application, or by using other applications on the mobile device that can access the cached content. Content predictably pre-fetched to the client application but never viewed is eventually purged from the device. In this manner, content of interest is retrieved to the mobile device in advance of its viewing and thus available for viewing on demand. Because content (such as video) is pre-populated on the user mobile device, the UPL (User Perceived Latency) for viewing the content is reduced to near zero. Moreover, because downloads are done in the background, the highest quality content can be obtained. All of these factors improve the QoE for the mobile end user.

Preferably, content delivered to the end user mobile device is zero-rated, and the content delivery network provider only charges for the delivery (to the UE) if it is later determined (e.g., by the CDN data collection infrastructure) that the end user actually viewed the pre-fetched content.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The following provides a background discussion of various enabling technologies upon which the techniques of this disclosure are supported.

Figure 1:
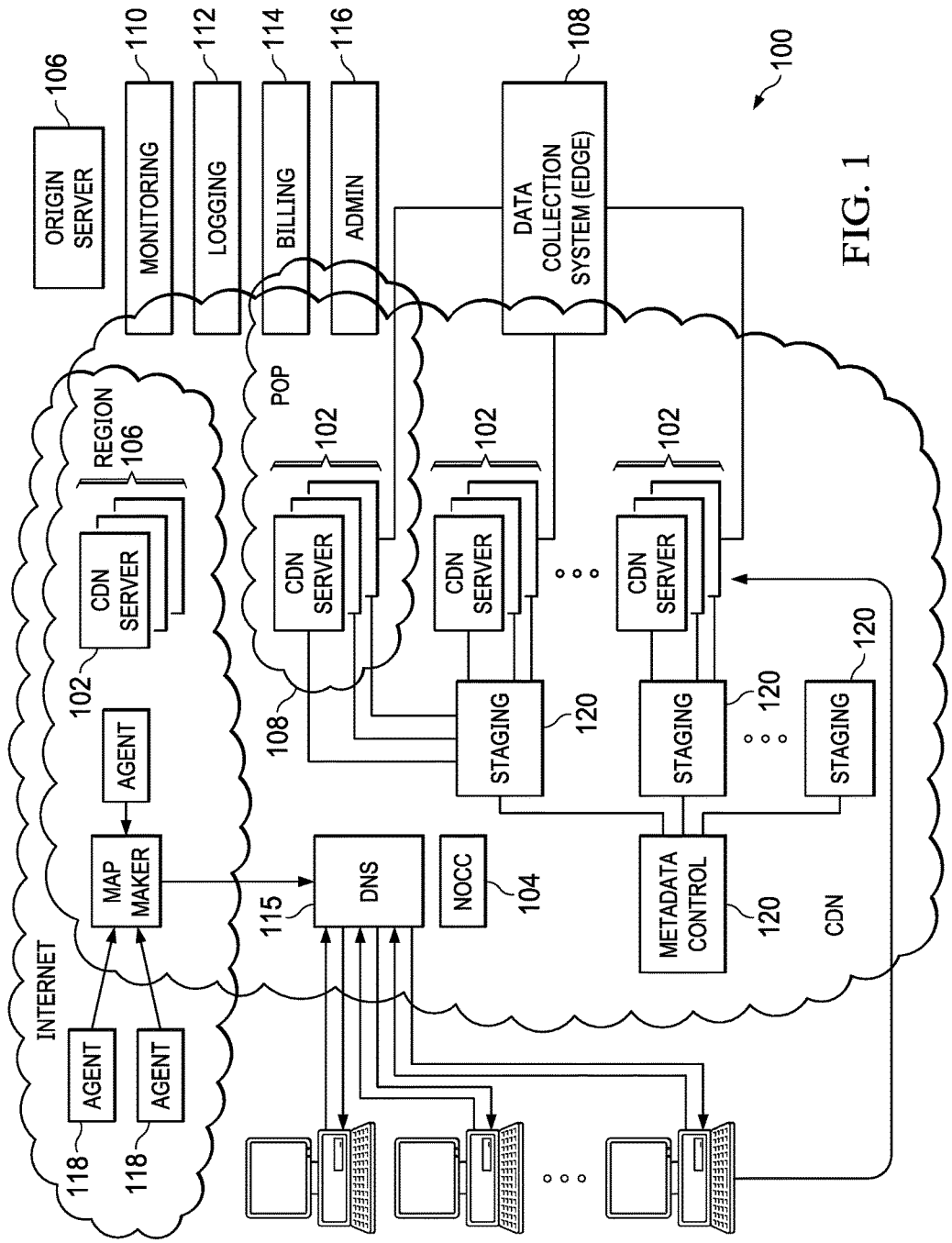
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the publicly-routed Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
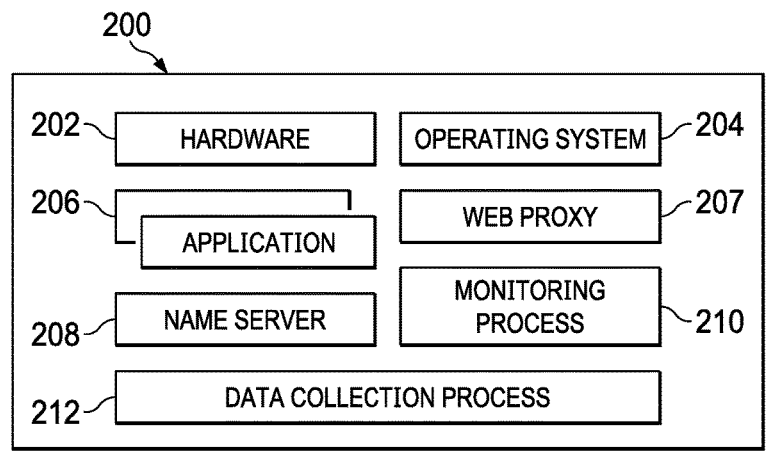
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration.

The CDN may provide secure content delivery among a client browser, edge server and customer origin server. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
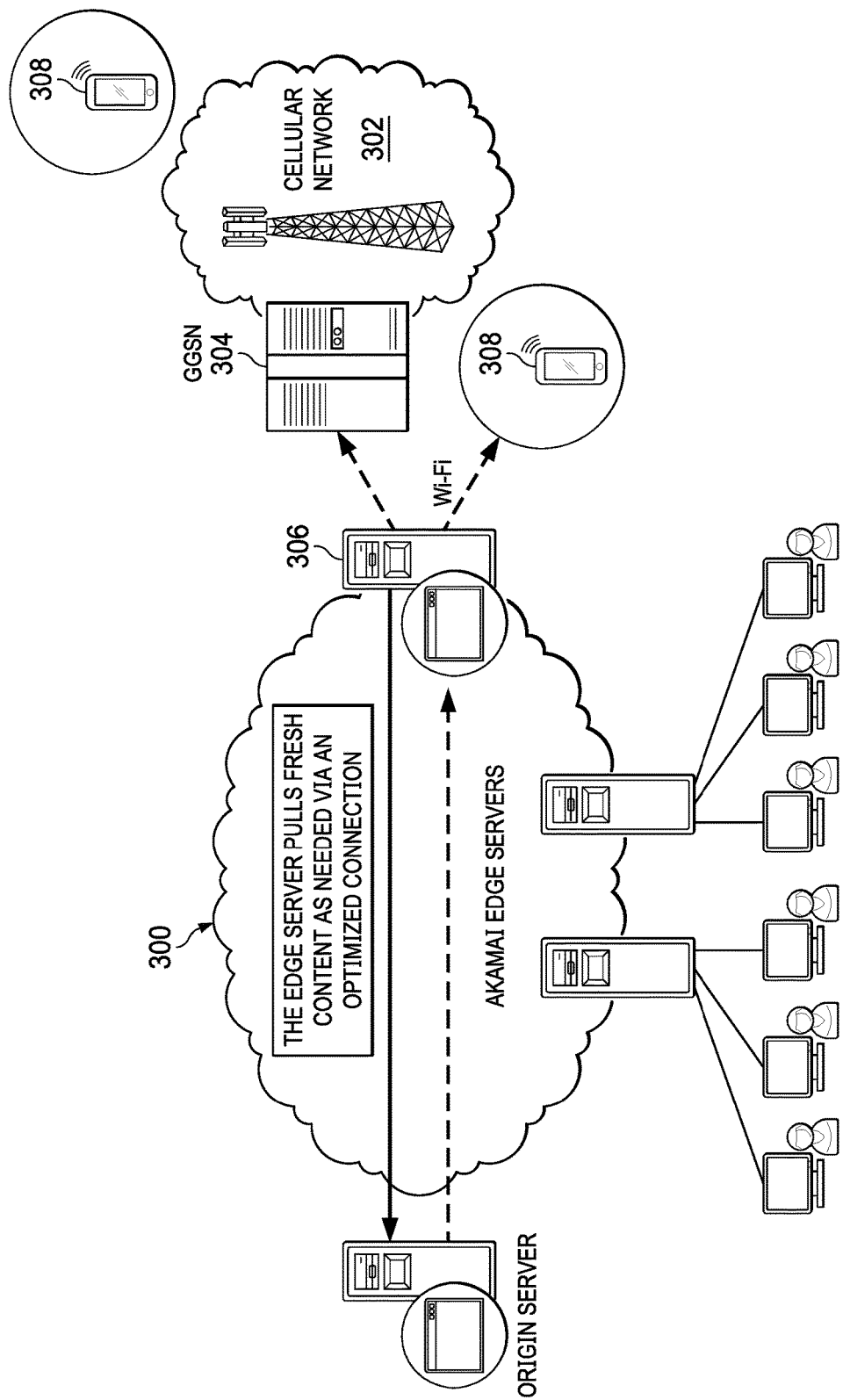
FIG. 3 illustrates how a mobile network interfaces with a CDN in a known configuration to enable mobile device users to obtain content that is accelerated by the CDN.

FIG. 3 illustrates an overlay network 300 interconnected to a cellular network 302. The mobile network 302 operates an Internet Protocol IP-based gateway, such as a Gateway GPRS Support Node ((GGSN) or equivalent, such as PDSN-HA (3G-CDMA) or PGW (LTE)) 304. In this example, an edge network 306 closest to the GGSN 304 (or its equivalent) is used to accelerate content into the cellular network 302. The cellular network 302 (more generally, a mobile broadband access network) typically is operated by a mobile network operator (MNO). Mobile devices 308 connect to the access network via known radio access network (RAN) technologies and systems. Mobile devices 308 also can retrieve content via other types of network connectivity, such as WiFi.

By way of additional background, mobile devices, such as a smartphone or tablet (e.g., Apple iPhone® and iPad® tablet, Android OS-based devices, wearable computing devices, etc.), have become ubiquitous in today's society. Faster processors, more memory, higher quality gesture-based multi-touch screens, availability of mobile broadband data, and integration of multi-media and GPS chips along with open interface mobile operating systems have opened the door for creation of a large variety of mobile applications.

Typically, but without limitation, a client device is a mobile device, such as a smartphone, tablet (e.g., an iPhone® or iPad®) or wearable computing device. Such a device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Figure 4:
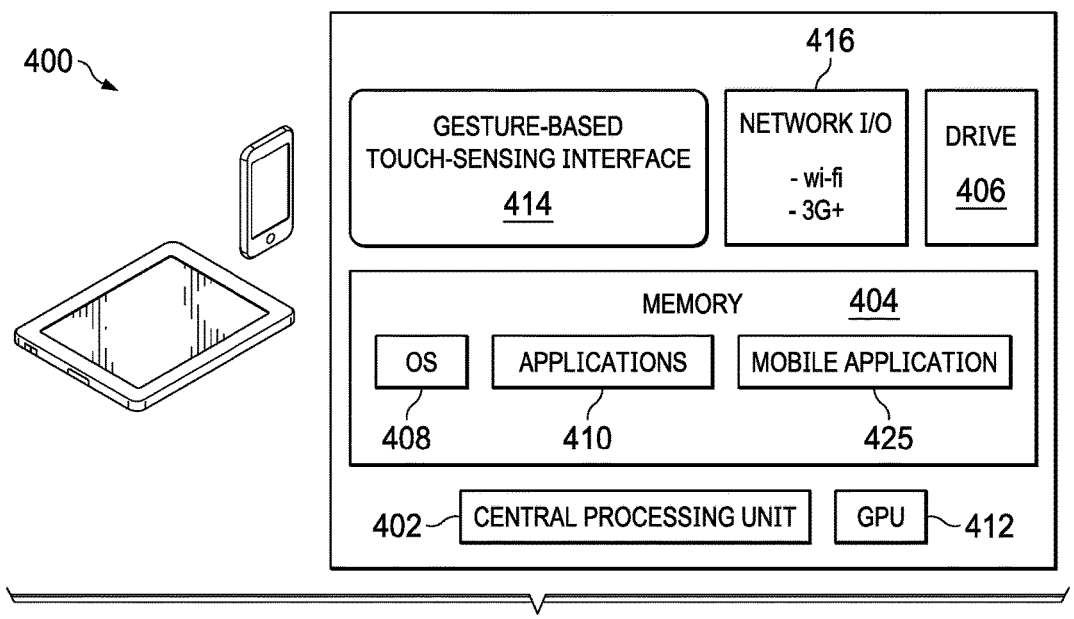
FIG. 4 illustrates a representative mobile device to which content is predictively pre-fetched according to this disclosure.

As seen in FIG. 4, a representative end user client device 400 comprises a CPU (central processing unit) 402, such as any Intel- or AMD-based chip, computer memory 404, such as RAM, and a drive 406 (e.g., Flash-based). The device software includes an operating system (e.g., Apple iOS, Google® Android™, or the like) 408, and generic support applications and utilities 410. As will be described below, the mobile device also supports a client application 424, sometimes referred to herein as a Video-over-Cellular (VoC)-client, to facilitate the content predictive pre-fetching service that will be described.

The device may also include a graphics processing unit (GPU) 412. In particular, the mobile device also includes an input device or interface 414 configured to receive input from a user's touch or other gesture, and to send this information to processor 412. The input device typically is a touch screen, but this is not a limitation. The input device or interface 414 recognizes sensory inputs, such as touches or other gestures, as well as the position, motion and magnitude of inputs on the user interface. The device also includes network I/O support 416 to support network transport (WiFi, 3G+). In operation, the touch-sensing device detects and reports the touches to the processor 412, which then interpret the touches in accordance with its programming.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The techniques herein are not limited to mobile networks that implement particular mobile broadband technologies. Thus, for example, the techniques may be implemented within or across any type of mobile network infrastructure. Another example includes, without limitation, Evolved Packet Core (EPC), which is the Internet Protocol (IP)-based core network defined by 3GPP in Release 8 for use by Long-Term Evolution (LTE) and other wireless network access technologies.

The underlying network transport may be any communication medium including, without limitation, cellular, wireless, Wi-Fi, small cell (e.g., femto), and combinations thereof.

Managing Subscription and Service Preferences of Mobile Users for Predictive Prefetch According to one aspect of this disclosure, a mobile device (UE) user is provided a client application that executes in the user's mobile device and that enables the device user to subscribe to content (e.g., video, music, other multi-media, and the like) from different websites, and to input viewing preferences for such content (e.g.: "Sports: MLB: Boston Red Sox"). This user subscription and preference information is sent to a CDN server cluster (one or more predictive pre-fetch servers) associated with the overlay network and that provides a predictive pre-fetch service on the user's behalf. Generally, the predictive pre-fetch service periodically detects new content available on the websites the CDN serves, determines the subset that is of interest to the mobile device user, and creates a download manifest of such content. The download manifest preferably comprises meta-information about the content of interest to the user. A predictive pre-fetch server in the cluster then notifies the client server PPF-Server then notifies the UE application to retrieve the download manifest, and then to pull down the content specified therein. The mobile device application downloads and caches the content(s). The mobile device user can then view the content through client application or using other applications on the mobile device that can access the cached content. In this manner, content of interest is retrieved to the mobile device in advance of its viewing and is thus "pre-fetched."

Figure 5:
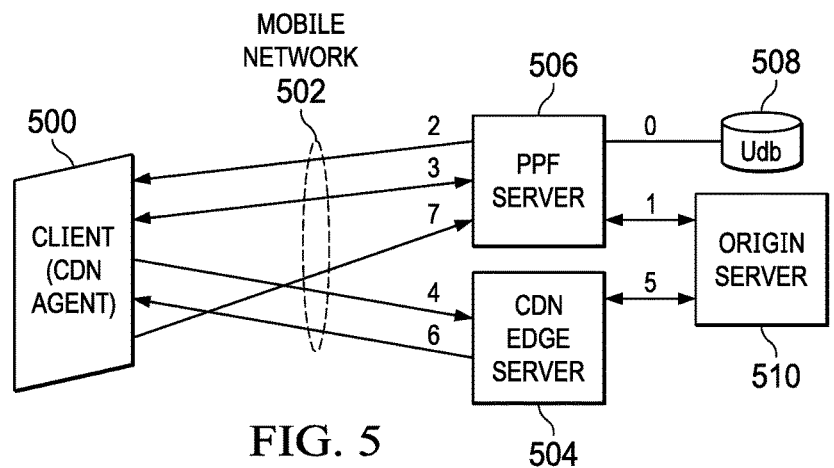
FIG. 5 depicts the basic predictive pre-fetch operation of this disclosure.

FIG. 5 illustrates the basic manner in which content transfer occurs in a service of this type that incorporate user preferences to predictively pre-fetch content. In this embodiment, a "user preference" typically refers to one or more websites to which the user subscribes, one or more "content types" within a particular site that user prefers to view, and a "service type" that the user selects from the mobile network. For example, one particular service type may enable the device to download content only during specific time periods, e.g., when the network is lightly loaded. Another service type may enable the device to download content over a lower priority bearer channel in the mobile network. The particular service type(s) may be designated or enforced by a mobile network operator that provides the service in association with the CDN.

As illustrated in FIG. 5, the mobile device 500 is the client, and the device includes the predictive pre-fetch application. This application is sometimes referred to as an "agent" application as it is used as the device's agent to pre-fetch content to the device on the user's behalf. The agent application may be retrieved to the mobile device in a conventional manner (e.g., from an app store), or it may be a native application. The predictive pre-fetch functionality may be built into one or more other applications that are available on the device. The mobile device 500 connects to the mobile network 502 via conventional radio access network (RAN) technologies (not shown), or it may use other connectivity such as WiFi, once again all in a well-known manner. In this embodiment, the CDN operates an overlay network that includes CDN edge server 504, and predictive pre-fetch (PPF) server 506 having a database 508. Content provider content of interest is sourced from an origin server 510.

In operation, the user of the mobile device 500 user initially registers the client device (e.g., through a website, or through the agent application running on the device) for the service and configures his or her user preferences. The PPF server 506 stores this user preference information in the associated user database 508. Of course, similar information is stored there on behalf of other mobile device users who use the service. In operation, at step (1), the PPF Server 506 detects new content in the websites that the users subscribe to by monitoring changes in the origin server 510. (In this example scenario, the origin server 510 is one such website). This monitoring may be done through various mechanisms, such as RSS (Really Simple Syndication) notifications from the origin server, through a web application programming interfaces (API) established between the CDN and the origin server, through other publish-subscribe techniques, and the like. The PPF server 506 then generates a list of downloadable content for the user (and for each other user) based on the user's stored preferences and newly available content that has been identified by the monitoring operation. This list of downloadable content for the user is the download manifest. The download manifest may include information such as, without limitation, title, description, media attributes, lifetime and URL of the content. At step (2), the PPF server 506 notifies the previously-registered client device 500 that new content is available for download. Preferably, this notification takes into account the client's network service type preference. Thus, for example, this notification preferably is sent by the PPF server 506 to the mobile device 500 taking into account the existing network conditions, such as network load and congestion. This operation is desirable because the PPF server 506 is likely to be managing download manifests for a large number of mobile devices. Upon receiving the notification, the agent application executing on the mobile device wakes up and contacts the PPF server 506 to fetch its download manifest. This is step (3).

At step (4), the agent application initiates the request operations to fetch the contents listed in the manifest, typically by connecting to an appropriate CDN edge server 504. The manner in which the agent application is directed to a particular CDN edge server 504 and obtains content is well-known, as explained above with respect to FIG. 1. At step (5), the CDN edge server 504 determines that the content is not present in its cache (or, if present, the content is stale), and thus contacts the origin server 510 to fetch it. At step (6), the content is returned to the agent application. Preferably, the client 500 then indicates provides the end user of the device with an indication that new content is available for viewing. This indication may be provided in any convenient manner, such as a device-specific user interface (UI) mechanism. Then, at some time in the future, the mobile device user may watch all or part of the downloaded content. Preferably, the agent application evicts the content when its lifetime (e.g., as indicated by a cache time-to-live (TTL)) expires. At step (7), the agent application reports back to the PPF server 506 data about what pre-fetch content was actually consumed. This consumption information, for example, includes data identifying the content that was consumed by the user, data identifying any un-watched (un-rendered) content, and any other user input regarding the pre-fetched content. As will be described, preferably the PPF server 506 then uses this consumption information to charge a content provider (e.g., origin server 510) for the consumed data. Preferably, the PPF server 506 also uses this information to update user preferences (stored in database 508) for other purposes, such as to refine future prediction about what content should be pre-fetched to the device in the future.

In this manner, content for each user registered for the service preferably is pre-fetched from the CDN in a background operation, i.e., without user intervention. Preferably, the content that is pre-fetched to a particular mobile device is based on previously-configured subscription and preference information maintained in the PPF server. The PPF server also determines when and what to download to the user device. Because the content is pre-fetched, the user perceived latency to view this content is near zero. Further, because the content is pre-fetched in the background, the download to a particular mobile device can take advantage of periods when the mobile network is lightly-loaded (e.g., at night, or during periods that have been predicted to have lower usage), thereby enabling the user device to obtain higher quality content e.g., high bit rate video or audio. In other words, because PPF server schedules when the content is downloaded from the CDN, in effect it controls the load and congestion on the mobile network (provided by such delivery from the edge servers). The PPF server thus can operate intelligently to insure that, as much as possible, downloads of the pre-fetched content preferentially occur during low-load and no-congestion intervals in the mobile network. Further, and as will be described, because the content provider is charged only for actual content consumed by the end user, the content provider is not penalized (by being charged for content delivery from the edge servers) for incorrect prediction.

The following provides a more detailed description of a preferred embodiment of the above-described predictive pre-fetching system and method. As noted above, a primary objective of the system is to pre-fetch and cache content (e.g., video, audio, other multi-media, etc.) content on a mobile device (UE), preferably based on user preferences and past viewing behavior, to thereby provide a seamless viewing experience with minimum user perceived latency. For discussion purposes only, the solution is sometimes referred to herein as predictive pre-fetch of video over cellular or, as a shorthand, "video-over-cellular" (or "VoC"). The reference to "video" is not intended to be limiting, although typically video delivery benefits the most from the described technique. Preferably, the delivery to the mobile device is carried out either when the cellular network is lightly loaded, or when the UE is connected through a Wi-Fi+ fixed broadband connection. In either case, preferably the downloaded content is separately metered (at the UE) and does not count against the user's regular data limits because the prediction itself (that the user will want to view the content) may not be correct. Without limitation, the predictive pre-fetch functionality may be provided or offered to the mobile device user "as-a-service," for example, through a mobile network operator (MNO). The notion that the service is sold by the MNO is not limiting, as a particular end user may obtain the service through other means, e.g., a content delivery network customer that uses the CDN to accelerate delivery of the site's content. Preferably, and as will be seen, the CDN service provider implements the predictive pre-fetch solution (for the MNO) as an adjunct to the CDN itself.

Figure 6:
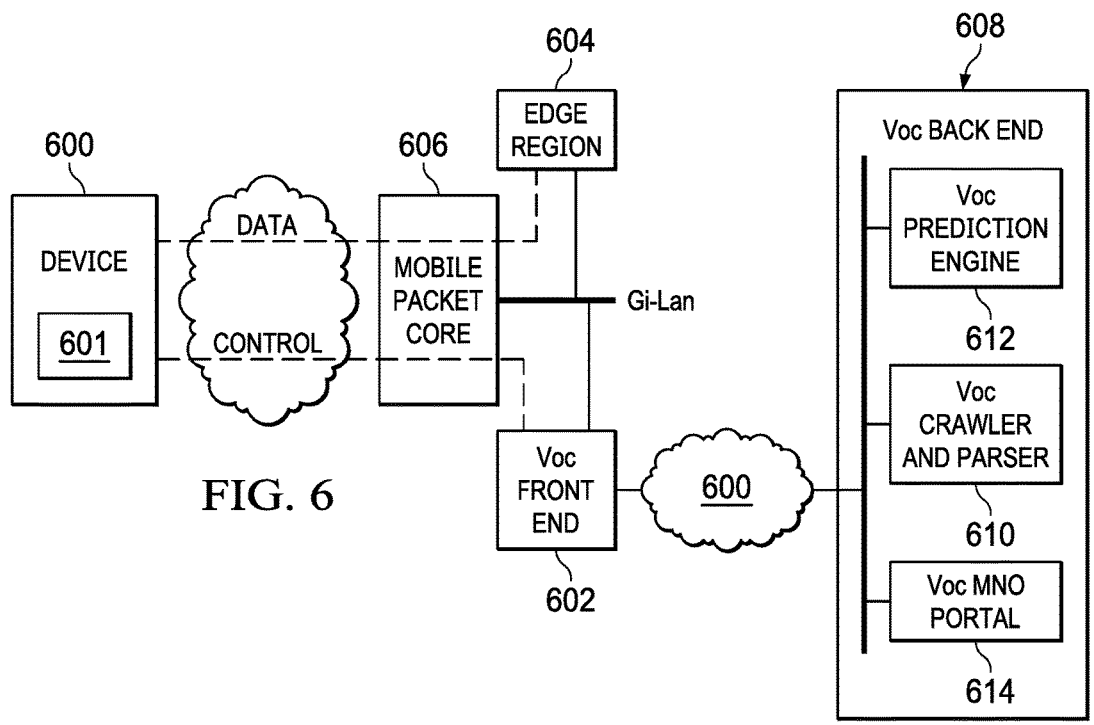
FIG. 6 depicts a preferred implementation architecture for the CDN-supported video-over-cellular (VoC) network of this disclosure.

The basic architecture of a preferred implementation is shown in FIG. 6. This architecture, as will be seen, provides a highly reliable, highly-available, and scalable solution for multiple CDN content provider customers, multiple mobile network operators (MNOs), and large numbers of mobile device users that utilize those mobile networks. To this end, preferably the CDN service provider bifurcates the predictive pre-fetch functionality (a VoC network 600) across a "front-end" and a "back-end." As depicted, client devices (UE) 600 with a VoC Server component called the VoCFE (VoC front-end) server 602, preferably using a given protocol to exchange control and status information. The VoCFE server 602 preferably is paired with an edge server region 604 (supporting one or more edge servers) proximal (latency-wise) to the MNO's packet core 606. Thus, while only one VoCFE server is depicted, preferably there are numerous VoCFE server instances that are located in association with the edge server regions, which themselves are widely disseminated. As also depicted, preferably the service includes a cluster of back-end servers (hereafter collectively referred to as "VoCBE") in a data center 608 and with which each VoCFE server 602 communicates. Preferably, and as will be described, the VoCBE 608 provides the following functions: detecting content updates (e.g., using Web crawling, RSS feed processing etc.), running prediction algorithms for content to deliver on a per user basis, maintaining a centralized database of user configuration, consumption history and analytical data, and providing secure web portal-based access to the service for MNO's, content providers and others to configure policy, preferences, and other data. To this end, preferably the VoCBE 608 includes a crawler/parser application 610, a prediction engine 612, and a portal application 614. There may be multiple instances of each such application, and there may be multiple instances of the VoCBE.

The basic operation of the system has been described above with respect to FIG. 5. In particular, and on the basis of the processing done by the VoCBE applications 610 and 612, the VoCFE 602 sends to the UE 600 download manifest(s) at opportune times. An agent application, namely, the VoC-client 601, then downloads the URL(s) in the manifest and caches the downloaded content to persistent storage on the device.

Using the portal application 614, the MNO or other service provider selects a set of content providers, zero rating policy, data limits, etc., for the service. This information is stored in the backend database. Preferably, end users subscribe to the service through the MNO and select packages and set preferences for content to be downloaded. The system includes an interface from the MNO to the VoCBE to pass this information. This information is stored in the back-end database. To this end, preferably the back-end servers maintain one or more centralized databases. Using the crawler/parser application 610, these servers crawl the selected web sites to detect content. Crawler/parser application 610 also obtains RSS feeds from news sites, and the like, and it invokes APIs for sites that provide them. Periodically, and using the prediction engine 612, new pre-fetchable content manifests (the download manifests) for each subscriber are generated, preferably using one or more prediction algorithms, and these download manifests are then communicated from the VoCBE to the VoCFE (for ultimate delivery to the UEs).

Without intending to be limiting, preferably the individual VoC clients 601 maintain communication with the VoCFE 602 using a simple "Hello" protocol with periodic keep-alive signaling. Other request-response protocols may be used. The mechanism allows the VoCFE instance to which the VoC-client is persistently connected to wake-up the client as needed, or to enable the client to re-connect to the nearest server. When a client (through its VoC-client 601) connects to the VoCFE server instance 602, preferably the front-end queries the VoCBE if it is a new user (e.g., in the case of a user moving between front-end instances) to authorize and authenticate the user. Preferably, the VoC-client 601 also reports to the front-end VoCFE server the current status regarding the client's network connection, cache storage, consumed and unused content from previous fetches, and other relevant information.

The VoCBE keeps track of the users currently attached to each VoCFE server instance. Due to user mobility across the mobile network, the "attaching" VoCFE for each user can change dynamically. Preferably, and as noted, the VoCBE periodically computes the download manifest for users belonging to each VoCFE, and sends this information to the appropriate front end VoCFE. Preferably, the download manifest comprises information such as, without limitation, title, description and URLs. Once the VoCFE server receives an indication from the back-end that content is available for a set of users, the VoCFE server instance starts waking up the associated UEs (connected thereto), preferably based on policy. The VoCBE preferably provides this indication to the front-end using a pre-fetchable content availability message that identifies the one or more users. The policy may be based on one or more factors, e.g., current network conditions, temporal considerations, or the like. The policy preferably also takes into account each client's currently-reported status (e.g., storage availability, power level, etc.), namely, its ability to carry out the transfer. For each VoC-client connected to the VoCFE, the particular download manifest for that client is then sent from the VoCFE. One convenient mechanism that may be used for this purpose is JSON message exchange. If conditions permit, the client (using the VoC-client operating in a background task) then downloads the URLs specified in the download manifest.

In one embodiment, the VoC-client is implemented as a browser/media-player application that executes on mobile device that are based on Apple iOS, Android, or others. The application may be initially pre-configured to provide content pre-fetching for a selected number of content providers, e.g., as defined by the MNO. The VoC-client has an associated cache (or can access addressable and available cache on the device). Preferably, pre-fetched content watched by the user is removed from the cache unless the user prefers to save it. Unused (i.e., un-watched) content may also be evicted after a period of time to make room for fresh content. Preferably, and as noted above, the client reports the usage information (pre-fetched versus consumed, download times, etc.) as analytics to the front-end. This reporting may occur periodically, on-demand, or each time the VoC-client makes a new connection with a front-end server. In turn, the front-end feeds this information back to the back-end prediction engine, which uses the data to "learn" the user's consumption behavior. In this manner, the system can dynamically and proactively adapt what content it predicts the UE-supported VoC-client should be notified to pre-fetch on the user's behalf. Generalizing, the VoCFE sends the user statistics (from the client) to the VoCBE, and this information is then used to fine tune a content prediction rule (for a particular user), as well as to generate aggregate usage reports for participating MNOs and content providers.

Preferably, and using the portal application, the MNO determines what content is made available to the users. In one non-limiting embodiment, content generally is grouped in the following levels: packages, content providers, categories and sub-categories. Upon user registration to the service, preferably some or all of these content groupings are downloaded to the device for display to the user. The user can see what offering to which he or she is subscribed, configure and purchase more offerings, etc. The particular manner in which the end user configures the device to use the service (or identifies particular content for pre-fetching) is not a limitation of this disclosure, as any convenient workflow, user interfaces, etc. may be used. The user configuration made through the device is pushed to the VoC back-end and stored in the central database.

Both the VoC control protocol traffic as well as the content traffic pre-fetched by VoC preferably is "zero-rated." As is well-known, content providers often strike up business relationships with mobile carriers such that no deduction is made from an end-user's data allowance when accessing the content provider's content. This practice is known as "zero-Rating" or "zero-rated billing" (ORB), because the data is rated as 0 bytes on the end-user's bill. Zero-rated support may be provided herein in one of several ways, e.g., the MNO may provide the CDN known, fixed ranges of source IP addresses for the servers that provide the above-described functions (that will be zero-rated). Preferably, a CDN server does not serve both zero-rated and non-zero-rated traffic from the same IP address. In the alternative, special zero-rated hostnames may be used for VoC-related traffic.

Ideally, content downloads are scheduled when the cell region of the UE is not congested or anticipated to be congested. In one embodiment, pre-configured time periods (e.g., during night time, during other off-peak periods known by the MNO a priori, etc.) may be used. Even during peak hours (daytime), however, there may well be intervals during which there is little or no congestion (and VoC traffic thus may be delivered). In particular, using known technologies it is possible to know in which cell geography a UE is currently located. If one assumes that the probability of congestion is going to be higher in the wireless network as opposed to the wired portion of the network path, the system can make an intelligent guess about overall network congestion level using various approaches. For example, MNOs may have network probes in various locations (e.g., at base stations) to monitor overall traffic and congestion conditions in different cell sites. This information may be made available to authorized services through APIs. If the VoCFE is able to access these information through such an API, it can schedule downloads to clients in the cell geography when the operator reports normal conditions there. As an alternative, the VoCFE can randomly select clients in a given cell geography and ping them from the VoCFE to measure the packet loss and latency. The latency during off-peak hours can be used as a baseline to detect congestion because packet latency will be greater during congestion. Another approach is to send a train of packets (spaced apart by a constant time) from the VoCFE to the VoC-Client and vice-versa. In this case, the receiver calculates the receive spacing between packets and reports back to the peer. This gives a more accurate measure of the latency and latency variation between the client and the VoCFE in both the upstream and downstream directions. Correlation of latency with baseline latency from off-peak hours then provides a measure of the network congestion. Yet another alternative may be used during peak traffic hours by having the client can download portions of the file (using the HTTP range request) and measure (and report back) the download rate. In cases where the download rate is low (indicating network congestion), the application can back-off for a random duration and then try again.

As noted above, preferably the back-end servers detect pre-fetchable content. The manner in which content is pre-fetched may vary from site-to-site. For some sites (content providers), the content is already customized and requires the VoC-client log-in to the site and obtain an authentication token that the back-end servers can then use for content mining. This is a preferred mechanism for social networks, and media collection sites. For news and other information services sites, typically the back-end server processes RSS feeds to detect new content. For other content, the system may invoke specific ReST-based APIs. Content providers following certain protocols (e.g., Sitemap) may publish or provide indexes (e.g., a sitemap.xml file in their root directory) that the system can use to aid in understanding the structure of the site and detecting new content. Site crawling may be implemented using known techniques, such as open source crawlers, custom Perl-based scripts, or using third party services. In one embodiment, a for a particular site, the crawler accesses top level pages and detects content updates, determines the structure of the page, traverses links if necessary, parses and retrieves key links (e.g., for video content), obtain content metadata (e.g., size, container, codec, etc.), and optionally downloads the content itself. In certain cases, the site itself has a recommendation engine that publishes information. In such case API provided by the site are used to obtain the content.

Preferably, detected content is analyzed, classified and catalogued so that the prediction engine can operate on it.

Preferably, the prediction engine receives inputs from one of more entities: web crawler, RSS parser, publication APIs, a user preferences database, a user consumption history database, and a user recently-served database. The web crawler typically provides entries with one or more fields, such as classification key (e.g., VoC_content_id_number (unique key to identify content internally to VoC service), content provider name and identifier, category, sub_category_1, sub_category_2, . . . sub_category_n), and results (e.g., tags, associated text, media type and attributes, lifetime, popularity, top level URL, etc.). For sites that prevent crawling but provide RSS notification, the RSS feed is obtained and parsed into the same format database entries as noted above for the web crawler. The publication API is a mechanism to enable content providers to notify the service of content to be pushed to clients subscribed to the service, and the information provided via these APIs may be processed into the above-described format. The user preferences database maintains user preference rules. The rules may be derived from user packages subscription, as well as the individual customization he or she selects. The entries here typically include: content provider name, category, sub-category, keywords, ontologies, or the like. The user consumption history database provides per-user history of various data, such as: voc_content_id_number, tags, etc. This data may be aged out periodically. The user recently served database includes per user entries, such VoC_content_id_number, URL, and the like. This prevents duplication of content.

The prediction engine runs one or more prediction algorithms. There is no requirement that any particular prediction algorithm be used. In one example embodiment, the classification rules (content provider/category/sub-category/etc.) from the user preference provide a first level refinement to overall content available. The keywords or ontologies then provide a second level refinement, e.g., based on pattern matching of the content tags or associated text. Media attributes (e.g., length, type, etc.) may then provide another refinement level. In addition, popularity associated with a particular URL (obtained, for example, from the content provider, from social media sources, by querying CDN analytics, etc.) may provide further refinement, as may historical consumption behavior by the user. In one particular embodiment, social networking preferences (e.g., likes, recommendations, channel subscriptions, etc.) of the end user are useful in determining an output of the prediction. More sophisticated data mining-based or machine learning-based algorithms can be invoked as well, e.g., by appropriately wrapping these inputs.

The following provides additional details regarding a preferred VoC control protocol between the VoC-client and VoCFE server. Using this protocol, and as has been described, the client transfers authentication tokens to the server, reports device state, and received download manifests.

The client-side of the protocol implements a presentation layer, UE policy management, UE cache management, analytics and content download. The presentation layer is implemented by the media player and browser functionalities for displaying cached content. Preferably, frameworks provided by the mobile OS platforms (Apple iOS, Android) are used for this purpose. Preferably, the cached content is displayed to the user by following the user experience guidelines of the platform. The UE policy management preferably is enabled through an interface and enables the user to configure cache size, eviction policy, power levels at which transfers are performed, and the like. To provide cache management, cached content is indexed and stored in a client database. Content preferably has an expiry time and is evicted even if it is not consumed. In general, preferably consumed content is evicted after a period of time to make room for new content. As noted above, however, preferably the user is able to save consumed content that does not have licensing restrictions for a longer duration. Content with licensing restrictions presumably is encrypted and saved. Initially, preferably the cache is divided equally among the content providers for which pre-fetching has been subscribed. Based on consumption behavior, the partition for each content provider may shrink or increase up to a maximum threshold. For analytics, preferably various statistical counters and analytical data related to content downloaded and consumed are gathered. This consumption information is then reported to the VoCFE periodically or otherwise, as has been described. The actual download of the URLs listed in the manifest sent from the VoCFE preferably is carried out using standard frameworks available on the mobile device platform, e.g., NSURL on iOS. Preferably, download takes into account per content provider rules, e.g., "download fully," "download only the first 'n' minutes," etc. In the latter, the user is able to select content into a queue for full retrieval in the background.

The server-side of the protocol is implemented by the VoCFE instance and includes user management, network condition detection, database management, crawling/parsing, predictions, and portal. The user management function on the VoCFE keeps track of the connected clients, and it obtains and manages authentication tokens required to access user-specific content. Further, the VoCFE obtains the user-specific download manifests from the back-end and, based on network conditions, wakes-up the connected clients and provides them manifests (so that the clients can then pull the subscribed content, preferably ORB during off-peak hours based on operator-configured time periods, or via WiFi at any time). As noted above, preferably both the VoCFE and VoCBE have databases to store user information with the back-end preferably being a centralized repository and the front-end storing only the information for users currently connected to it. The back-end also stores content information, analytical data, user consumption history, and other such data. A database manager component preferably is used to create and maintain tables and entries, to manage schema, and for monitoring and maintenance. Information exchanged between the VoCFE instance and the VoCBE preferably occurs via a request/response based application protocol over TCP. Other techniques, such as Web services, publish-subscribe, etc., may be used. Preferably, and as noted, the front-end informs the back-end of clients connecting to the front-end, and their associated analytical data. The back-end compute the download manifests for the users connected to each front-end, and sends those manifests to each appropriate front-end periodically, or on-demand. The crawler/parser, and prediction engines are the software functions that run in the VoCBE periodically to generate the download manifests for the users. Finally, the portal enables provisioning of packages and selection of content providers (Web sites) and different categories within these channels. This information is stored in the database and is used by the VOC back-end server's web crawler functionality. Preferably, via the portal the MNO also is able to configure policies related to the zero rating (time, duration, data limits, etc.). When changes are made to a package, this information preferably pushed to the device and the user is notified. Via the portal, the content provider may also configure policies related to content licensing, and the like.

The particular manner in which the VoCFE wakes-up the VoC-client, and by which the VoC-client posts status and retrieves download manifests, is not limited. In one embodiment, the VoC-client first establishes connection with a nearest available VoCFE server, identified by DNS mapping of a CDN-specific hostname.

The VoC client connects to the VoCFE in any convenient manner, e.g., by opening a UDP socket. When a socket connection is used, the front-end server can periodically send keep-alive messages, or it can wake-up the client by sending UDP packets when it has content to deliver. In another mode, the client may provide a notification token to the front-end server, which the latter may then later use as needed to wake-up the client.

Once the client wakes up, it reports status to the VoCFE, e.g., by doing an HTTPS post. The POST response is the download manifest if it is ready. Preferably, the body of these messages is in a JSON format.

Once the client receives the download manifest, preferably the client downloads the URLs in the manifest using OS-specific library calls. The downloaded content is then cached.

Figure 7:
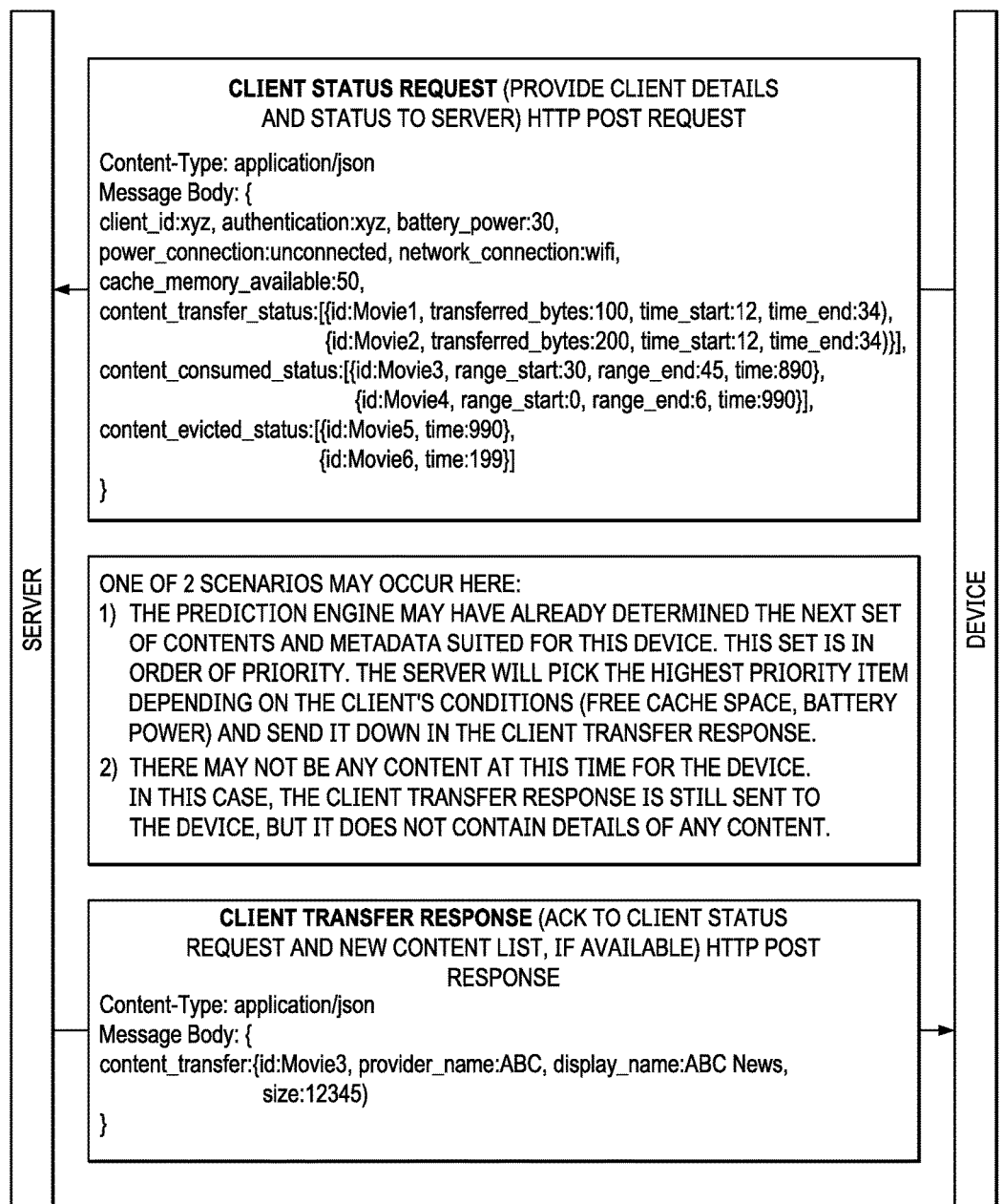
FIG. 7 depicts a representative client status request—client transfer response interaction between a UE VoC-client and its associated VoCFE server instance according to this disclosure.

FIG. 7 illustrates a representative client status request-client transfer response interaction between the UE and the VoCFE to which it is connected. The structure and format of this interaction is not intended to be limiting.

As previously noted, the content delivery network includes data collection, reporting and billing infrastructure to report to its content provider customers on the content delivered from the platform to requesting end users. When predictive pre-fetching as described herein is used, content delivered to the mobile device may never be viewed by the end user (because it is not specifically requested by the user himself). Thus, in addition to the zero-rated billing functionality previously described, the CDN itself must include back-end systems to ensure that content providers are not also billed for delivery of un-watched content. To this end, edge server data collection/billing data must be correlated with the VoCFE-collected status information to ensure that particular content delivered (by an edge server) but un-watched by the end user (as reported by VoCFE) is not counted against (charged to) a content provider. Thus, the CDN data collection/billing systems must credit the content provider for any particular content delivered to the VoC-client but not reported as viewed.

The technique described herein provides significant advantages. Because video content is pre-populated on the user mobile device, the UPL (User Perceived Latency) for viewing the content is reduced to near zero. By caching video content for later viewing, replay, seek and other DVR (Digital Video Recorder)-like functions appear seamless. Further, because downloads are done in the background, the highest quality content can be obtained. All of these factors improve the QoE for the mobile end user.

There are many variants that may be implemented, and all are within the scope of this disclosure.

For example, content downloads scheduled by the VoCFE(s) can be staggered in such a way that the network resources are used more optimally. This has considerable economic advantages for network operators. For example, if the download is done during off-peak intervals, the mobile network operator is able to monetize the more efficient network utilization.

Another variant is to enable content from content providers that do not use the CDN to also be available for predictive pre-fetching. In such case, appropriate metering of such data flowing through the VoC network can be achieved using the VoCFE as a proxy. In this embodiment, the VoCFE downloads content from the content server (typically not an edge server) on the UE's behalf. The VoCFE then passes the content along to the device. Proxying in this manner enables the possibility of doing other optimizations in the VoCFE before delivering the content to the UE. For example, if HTTP 2.0/SPDY is implemented on both sides, the number of TCP connection setups can be reduced. In this context, VoC conceptually is a push service, and using SPDY the VoCFE server pushes content to the UE.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality (or portions of it) is implemented in an application layer solution, although this is not a limitation, as portions of the identified functions (e.g., on the client side) may be built into a mobile device operating system or the like. The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

While the techniques herein are focused on video, this is not a limitation. The techniques herein may be above to any generic content (e.g., music, photos, web pages, and so forth).

The techniques herein generally provide for the above-described improvements to a technology or technical field, as well as the specific technological improvements to various fields including distributed networking, Internet-based overlays, mobile networking, mobile device technologies, content management systems, and the like, all as described above.

Having described our invention, what we now claim is set forth below.

The invention claimed is:

1. Apparatus associated with an overlay network operating as a content delivery network (CDN) on behalf of sites of participating content providers, comprising:
a set of hardware processors;
computer memory associated with each hardware processor; and
computer program instructions stored in computer memory and executed by a hardware processor as: an instance of a front-end server application configured to execute in association with an CDN edge server located proximal to a mobile network operator (MNO) core network that is distinct from the overlay network, and a back-end server application configured to execute in the CDN to provide support for multiple instances of the front-end server application, wherein bifurcation of functionality provided by the front-end server application instance and the back-end server application improves an operation of the overlay network operating as a CDN;
wherein the back-end server application is operative to (i) receive and store, for each of a set of mobile devices, a set of preferences, the set of preferences including an identification of given content that originates with the CDN participating content providers and that is deliverable over the CDN, and that an end user of a mobile device has provided an indication is desired to be predictively prefetched to the end user mobile device; (ii) based at least in part on the preferences associated with a particular end user mobile device, predict content of interest, the content of interest being content then available to be delivered from the CDN; (iii) generate a manifest for the particular end user mobile device identifying the content of interest and its location; and (iv) provide the manifest to a particular instance of the front-end server application;
wherein the particular instance of the front-end server application is operative to (i) notify the particular end user mobile device of availability of the manifest; and (ii) responsive to a request, provide the manifest to the particular end user mobile device;
wherein the particular instance of the front-end server application is further operative to wake-up an end user mobile device in response to receiving the manifest from the back-end server application.

2. The apparatus as described in claim 1 wherein the particular instance of the front-end server application provides the manifest for each of a set of mobile devices that are connected to the front-end server application instance.

3. The apparatus as described in claim 2 wherein the back-end server application provides the particular instance of the front-end server application with a manifest for each of the set of mobile devices that are connected to the front-end server application instance.

4. The apparatus as described in claim 1 wherein the back-end server application is further operative identify the content of interest by monitoring changes to one or more content provider sites.

5. The apparatus as described in claim 4 wherein the changes are received by the back-end server application by one of: crawling the content provider site, receiving a syndication feed from the content provider site, and receiving change notifications published by the content provider site over an application programming interface (API).

6. The apparatus as described in claim 1 wherein the particular instance of the front-end server application further is operative to receive from an end user mobile device consumption information, the consumption information indicating whether the content of interest has been viewed.

7. The apparatus as described in claim 6 wherein the back-end server application is further operative to modify data collected by the overlay network in association with the automated retrieval of the content of interest in accordance with the consumption information.

8. The apparatus as described in claim 1 wherein at least the manifest is provided to the end user mobile device as zero-rated data.

9. The apparatus as described in claim 6 wherein the content of interest also is predicted based at least in part on the consumption information.

10. Apparatus associated with an overlay network operating as a content delivery network (CDN) on behalf of sites of participating content providers, comprising:
a set of hardware processors;
computer memory associated with each hardware processor; and
computer program instructions stored in computer memory and executed by a hardware processor as: a client application, an instance of a front-end server application configured to execute in association with an CDN edge server located proximal to a mobile network operator (MNO) core network that is distinct from the overlay network, and a back-end server application configured to execute in the CDN to provide support for multiple instances of the front-end server application, wherein bifurcation of functionality provided by the front-end server application instance and the back-end server application improves an operation of the overlay network operating as a CDN;
wherein the back-end server application is operative to (i) receive and store, for each of a set of mobile devices, a set of preferences, the set of preferences including an identification of given content that originates with the CDN participating content providers and that is deliverable over the CDN, and that an end user of a mobile device has provided an indication is desired to be predictively prefetched to the end user mobile device; (ii) based at least in part on the preferences associated with a particular end user mobile device, predict content of interest, the content of interest being content then available to be delivered from the CDN; (iii) generate a manifest for the particular end user mobile device identifying the content of interest and its location; and (iv) provide the manifest to a particular instance of the front-end server application;

wherein the particular instance of the front-end server application is operative to (i) notify the particular end user mobile device of availability of the manifest; and (ii) responsive to a request, provide the manifest to the particular end user mobile device;

wherein the particular instance of the front-end server application is further operative to wake-up the client application in response to receiving the manifest from the back-end server application;

wherein the client application is operative to (i) provide the set of preferences; (ii) issue the request; (iii) receive the manifest; and (iv) control the end user mobile device to automatically retrieve to the mobile device from the CDN edge server the content of interest.

11. The apparatus as described in claim 10 wherein the particular instance of the front-end server application provides the manifest for each of a set of mobile devices that are connected to the front-end server application instance.

12. The apparatus as described in claim 11 wherein the back-end server application provides the particular instance of the front-end server application with a manifest for each of the set of mobile devices that are connected to the front-end server application instance.

13. The apparatus as described in claim 10 wherein the back-end server application is further operative identify the content of interest by monitoring changes to one or more content provider sites.

14. The apparatus as described in claim 13 wherein the changes are received by the back-end server application by one of: crawling the content provider site, receiving a syndication feed from the content provider site, and receiving change notifications published by the content provider site over an application programming interface (API).

15. The apparatus as described in claim 10 wherein the particular instance of the front-end server application further is operative to receive from the client application consumption information, the consumption information indicating whether the content of interest has been viewed.

16. The apparatus as described in claim 15 wherein the back-end server application is further operative to modify data collected by the overlay network in association with the automated retrieval of the content of interest in accordance with the consumption information.

17. The apparatus as described in claim 10 wherein at least the manifest is provided to the end user mobile device as zero-rated data.

18. The apparatus as described in claim 15 wherein the content of interest also is predicted based at least in part on the consumption information.

* * * * *